(12) United States Patent
Stasik et al.

(10) Patent No.: US 9,951,757 B2
(45) Date of Patent: Apr. 24, 2018

(54) INCREASED FORCE GENERATION IN ELECTROACTIVE POLYMERS

(71) Applicant: Battelle Memorial Institute, Columbus, OH (US)

(72) Inventors: Mark C. Stasik, Columbus, OH (US); Jay R. Sayre, New Albany, OH (US)

(73) Assignee: BATTELLE MEMORIAL INSTITUTE, Columbus, OH (US)

(*) Notice: Subject to any disclaimer, the term of this patent is extended or adjusted under 35 U.S.C. 154(b) by 206 days.

(21) Appl. No.: 14/815,769

(22) Filed: Jul. 31, 2015

(65) Prior Publication Data
US 2016/0036353 A1    Feb. 4, 2016

Related U.S. Application Data

(60) Provisional application No. 62/031,519, filed on Jul. 31, 2014.

(51) Int. Cl.
*B32B 9/04* (2006.01)
*F03G 7/00* (2006.01)

(52) U.S. Cl.
CPC .................... *F03G 7/005* (2013.01)

(58) Field of Classification Search
CPC .. Y10S 310/80; Y10S 977/724; Y10S 977/86; Y10S 977/861; Y10S 977/869;
(Continued)

(56) References Cited

U.S. PATENT DOCUMENTS

| 4,945,962 A | 8/1990 | Pajtas |
| 5,561,337 A * | 10/1996 | Toda ............ H02N 2/001 310/322 |

(Continued)

FOREIGN PATENT DOCUMENTS

| EP | 1894748 A1 | 3/2008 |
| WO | 2007103832 A2 | 9/2007 |

(Continued)

OTHER PUBLICATIONS

Ahn, et al., "Electrochemical Capacitors Based on Electrodeposited Ruthenium Oxide on Nanofibre Substrates," Nanotechnology, 2006, v.17, pp. 2865-2869.

(Continued)

*Primary Examiner* — Antony M Paul
(74) *Attorney, Agent, or Firm* — Benesch Friedlander Coplan & Aronoff, LLP; Benjamen E. Kern; Kraig K. Anderson

(57) ABSTRACT

Methods and systems are provided for combined direct current and alternating current activation of electroactive polymer devices. The combined direct current and alternating current activation may increase force generation compared to activation using direct current alone. For example, a method for actuating an electroactive polymer device may include providing the electroactive polymer device. The electroactive polymer device may include a first electrode and a second electrode electrically coupled to an electroactive polymer. The method may include applying a direct current across the electroactive polymer via the first and second electrodes. The method may include applying an alternating current across the electroactive polymer. The direct current and the alternating current may be effective to cause actuation of the electroactive polymer device.

20 Claims, 16 Drawing Sheets

(58) Field of Classification Search
CPC ............ Y10S 977/935; Y10S 977/943; Y10S 977/947; H01L 41/0986; H01L 41/193; H01L 41/45; H01L 41/042; H01L 41/094; H01L 41/0478; H01L 41/08; B32B 7/04; B32B 5/16; B32B 9/04; C08G 75/02; B05D 5/12; H02P 1/00; H02P 3/00; H02P 6/00
USPC ............... 428/411.1, 419, 323, 327; 427/58; 524/609; 310/365, 323.06, 342, 177; 335/71, 93, 155, 57, 89; 337/122; 340/852; 219/61.4, 780, 66, 84, 86.32
See application file for complete search history.

(56) References Cited

U.S. PATENT DOCUMENTS

| | | | | |
|---|---|---|---|---|
| 6,586,859 | B2* | 7/2003 | Kornbluh | A63H 13/00 310/309 |
| 6,768,246 | B2* | 7/2004 | Pelrine | F02G 1/043 310/317 |
| 6,806,621 | B2 | 10/2004 | Heim et al. | |
| 6,876,135 | B2* | 4/2005 | Pelrine | A43B 3/0005 310/317 |
| 6,882,086 | B2* | 4/2005 | Kornbluh | B60G 17/01941 310/328 |
| 6,891,317 | B2* | 5/2005 | Pei | A61M 5/142 310/328 |
| 6,911,764 | B2* | 6/2005 | Pelrine | F04B 35/00 310/328 |
| 7,034,432 | B1* | 4/2006 | Pelrine | F02G 1/043 310/309 |
| 7,064,472 | B2* | 6/2006 | Pelrine | A61M 5/142 310/324 |
| 7,199,501 | B2* | 4/2007 | Pei | F02G 1/043 310/309 |
| 7,224,106 | B2* | 5/2007 | Pei | F02G 1/043 310/311 |
| 7,233,097 | B2* | 6/2007 | Rosenthal | A61M 5/142 310/328 |
| 7,259,503 | B2* | 8/2007 | Pei | F02G 1/043 310/330 |
| 7,320,457 | B2* | 1/2008 | Heim | F04B 35/045 239/601 |
| 7,362,032 | B2* | 4/2008 | Pelrine | A61M 5/142 310/309 |
| 7,368,862 | B2* | 5/2008 | Pelrine | F02G 1/043 310/365 |
| 7,468,575 | B2* | 12/2008 | Pelrine | F02G 1/043 310/363 |
| 7,537,197 | B2* | 5/2009 | Heim | F16K 99/0001 239/601 |
| 7,608,989 | B2* | 10/2009 | Heydt | H04R 19/02 310/317 |
| 7,705,521 | B2 | 4/2010 | Heim et al. | |
| 7,731,826 | B2* | 6/2010 | Hibbs | G01N 33/48721 204/400 |
| 7,761,981 | B2* | 7/2010 | Rosenthal | A61M 5/142 29/825 |
| 7,898,159 | B2* | 3/2011 | Heydt | H04R 19/02 310/317 |
| 7,911,115 | B2* | 3/2011 | Pelrine | A61M 5/142 310/328 |
| 7,923,064 | B2* | 4/2011 | Pelrine | F02G 1/043 427/171 |
| 7,971,850 | B2* | 7/2011 | Heim | F16K 99/0001 239/597 |
| 8,042,264 | B2* | 10/2011 | Rosenthal | A61M 5/142 29/25.03 |
| 8,574,716 | B2* | 11/2013 | Wu | C08J 5/2256 427/58 |
| 8,780,060 | B2* | 7/2014 | Maschmeyer | G06F 3/016 345/156 |
| 8,981,621 | B2* | 3/2015 | Pelrine | H01L 41/45 310/328 |
| 2001/0036790 | A1* | 11/2001 | Kornbluh | A63H 13/00 446/337 |
| 2002/0130673 | A1* | 9/2002 | Pelrine | A63H 3/365 324/727 |
| 2002/0175594 | A1* | 11/2002 | Kornbluh | B60G 17/01941 310/317 |
| 2002/0175598 | A1* | 11/2002 | Heim | H02N 2/101 310/328 |
| 2003/0006669 | A1* | 1/2003 | Pei | A61M 5/142 310/309 |
| 2003/0067245 | A1* | 4/2003 | Pelrine | A43B 3/0005 310/311 |
| 2003/0214199 | A1* | 11/2003 | Heim | F04B 35/045 310/309 |
| 2005/0162049 | A1 | 7/2005 | Krill | |
| 2006/0119225 | A1* | 6/2006 | Heim | H02N 2/101 310/339 |
| 2007/0200467 | A1* | 8/2007 | Heydt | H04R 19/02 310/311 |
| 2008/0022517 | A1* | 1/2008 | Rosenthal | A61M 5/142 29/829 |
| 2008/0041733 | A1* | 2/2008 | Hibbs | G01N 33/48721 205/775 |
| 2008/0245985 | A1* | 10/2008 | Heim | F16K 99/0001 251/129.06 |
| 2009/0032394 | A1* | 2/2009 | Wu | C08J 5/20 204/400 |
| 2009/0200501 | A1* | 8/2009 | Heim | F16K 99/0001 251/129.06 |
| 2009/0301875 | A1* | 12/2009 | Wu | G01N 27/406 204/400 |
| 2010/0013356 | A1* | 1/2010 | Heydt | H04R 19/02 310/334 |
| 2010/0141085 | A1* | 6/2010 | Wu | C08J 5/2256 310/311 |
| 2010/0164324 | A1* | 7/2010 | Kim | H01G 5/16 310/318 |
| 2010/0176322 | A1* | 7/2010 | Heim | F16K 99/0001 251/129.06 |
| 2010/0263181 | A1* | 10/2010 | Rosenthal | A61M 5/142 29/25.35 |
| 2011/0025170 | A1* | 2/2011 | Rosenthal | A61M 5/142 310/328 |
| 2011/0304240 | A1* | 12/2011 | Meitav | A61N 1/3785 310/319 |
| 2012/0105333 | A1* | 5/2012 | Maschmeyer | G06F 3/016 345/173 |
| 2012/0299514 | A1* | 11/2012 | Anderson | H01L 41/107 318/116 |
| 2013/0192910 | A1 | 8/2013 | Sayre et al. | |
| 2014/0320276 | A1* | 10/2014 | Maschmeyer | G06F 3/016 340/407.2 |

FOREIGN PATENT DOCUMENTS

WO 2008118983 A1 10/2008
WO 2011163530 A1 12/2011

OTHER PUBLICATIONS

Yoon, et al., "CoNi Oxide/CarbonNanofiber Composite Electrodes for Supercapacitors," Int. J. Electrochem. Sci., 2008, v. 3, pp. 1340-1347.

Akle, et al., "Effects of Electrode Morphology on the Performance of BPSH and PATS Ionic Polymer Transducers," Smart Structures and Materials 2004: Electroactive Polymers Actuators and Devices, Proc. SPIE, 2004, v. 5385, pp. 413-424, doi: 10.1117/12.539528.

Zheng, et al., "Preparation and Electrochemical Properties of Multiwalled Carbon Nanotubes—Nickel Oxide Porous Composite for Supercapacitors," Materials Research Bulletin, 2007, v. 42, pp. 1740-1747.

Bar-Cohen, "EAP Applications, Potential, and Challenges" in Electroactive Polymer (EAP) Actuators as Artificial Muscles: Real-

(56) References Cited

OTHER PUBLICATIONS ity, Potential, and Challenges (2nd edition).; Chapter 21, Section 21.6, pp. 720-721; SPIE Press: Bellingham, Washington, 2004.
Bonomo, "A Circuit to Model the Electrical Behavior of an Ionic Polymer-Metal Composite," IEEE Transactions on Circuits and Systems—I: Regular Papers, 2006, v. 53, pp. 338-350.
Shahinpoor, "Ion-Exchange Polymer-Metal Composites as Biomimetic Sensors and Actuators" in Polymer Sensor and Actuators; Chapter 12, pp. 325-408; Springer-Verlag Berlin Heidelberg GmbH: New York, 2000.
Ali, et al., "Giant-Stroke, Superelastic Carbon Nanotube Aerogel Muscles," Science 2009, v. 323, pp. 1575-1578.
Written Opinion, dated Oct. 31, 2011, of related application PCT/US2011/041708, filed Jun. 23, 2011.
International Search Report of related application PCT/US2011/041708, filed Jun. 23, 2011.
Ebron, et al., "Fuel-Powered Artificial Muscles," Science, 2006, v. 311, pp. 1580-1583.
Madden, "Artificial Muscle Begins to Breathe," Science, 2006, v. 311, pp. 1559-1560.
Shahinpoor, et al., "Ionic Polymer-Metal Composites (IPMC) as Biomimetic Sensors, Actuators & Artificial Muscles—A Review," Smart Mater. Struct. 1998, v. 7, pp. 1-27, doi: 10.1088/0964-1726/7/6/001.

* cited by examiner

TABLE 1

| Parameter | Variation 1 | Variation 2 |
|---|---|---|
| Center ion exchange membrane | NAFION® 115 (0.005 in = 127 μm thick) | |
| Electrode metal | RuO₂ | |
| Electrode ion conducting binder | NAFION® | |
| Membrane solvent | Ionic liquid (1-ethyl-3-methylimidazolium trifluoromethanesulfonate; CAS 145022-44-2) | None (dry) |
| Outer layer coating | Vacuum evaporation deposition gold coating: ~100 nm gold coating: < 10 Ω/cm | |

FIG. 4

Initial Position

Apply Voltage

INCREASED FORCE GENERATION IN ELECTROACTIVE POLYMERS

CROSS-REFERENCE TO RELATED APPLICATIONS

This application claims priority to U.S. Provisional Patent Application No. 62/031,519, filed on Jul. 31, 2014, which is incorporated by reference herein in its entirety.

BACKGROUND

Electroactive polymers (EAPs) are materials that change shape, or deflect, in response to an applied voltage or electric field. Ionic, wet, or electrochemical EAPs may deflect due to ionic mass transport in response to an applied voltage. Actuators, artificial muscles, and other applications and devices use EAPs to convert electrical potential to force, and electrical energy to mechanical energy. Devices may include, for example, linear actuators and rotary motion devices. Applications such as medical devices, robotics, biomimetics, mechatronics, vehicles, aerospace systems, micro-electro-mechanical systems (MEMS), entertainment devices, sensors for, e.g., vibration, and the like may employ EAPs.

It is an ongoing challenge in the field to provide increased force generation for any given EAP application. For example, in applications with weight constraints, such as robotic aircraft, it is desirable to provide increased EAP performance at lower weight. The present application appreciates that generating force in electroactive polymers may be a challenging endeavor.

SUMMARY

In one embodiment, a method for actuating an electroactive polymer device is provided. The method may include providing the electroactive polymer device. The electroactive polymer device may include a first electrode and a second electrode electrically coupled to an electroactive polymer. The method may include applying a direct current across the electroactive polymer via the first and second electrodes. The method may include applying an alternating current across the electroactive polymer. The direct current and the alternating current may be effective to cause actuation of the electroactive polymer device.

In another embodiment, an electroactive polymer actuator system is provided. The electroactive polymer actuator system may include an electroactive polymer device. The electroactive polymer device may include a first electrode and a second electrode electrically coupled to an electroactive polymer layer. The electroactive polymer actuator system may include a power supply operatively coupled to the first and second electrodes. The electroactive polymer actuator system may include a controller. The controller may be programed with instructions. The instructions may include controlling power supply to apply a direct current across the electroactive polymer layer via the first and second electrodes. The instructions may be configured for controlling the power supply to apply an alternating current across the electroactive polymer layer.

BRIEF DESCRIPTION OF THE DRAWINGS

The accompanying figures, which are incorporated in and constitute a part of the specification, illustrate example methods and apparatuses, and are used merely to illustrate example embodiments.

FIG. 4 depicts Table 1, a summary of two example EAP device configurations described in the EXAMPLES;

DETAILED DESCRIPTION

The present application relates to methods of force generation in EAPs using alternating current, and in particular, alternating current in combination with direct current.

Figure 1:
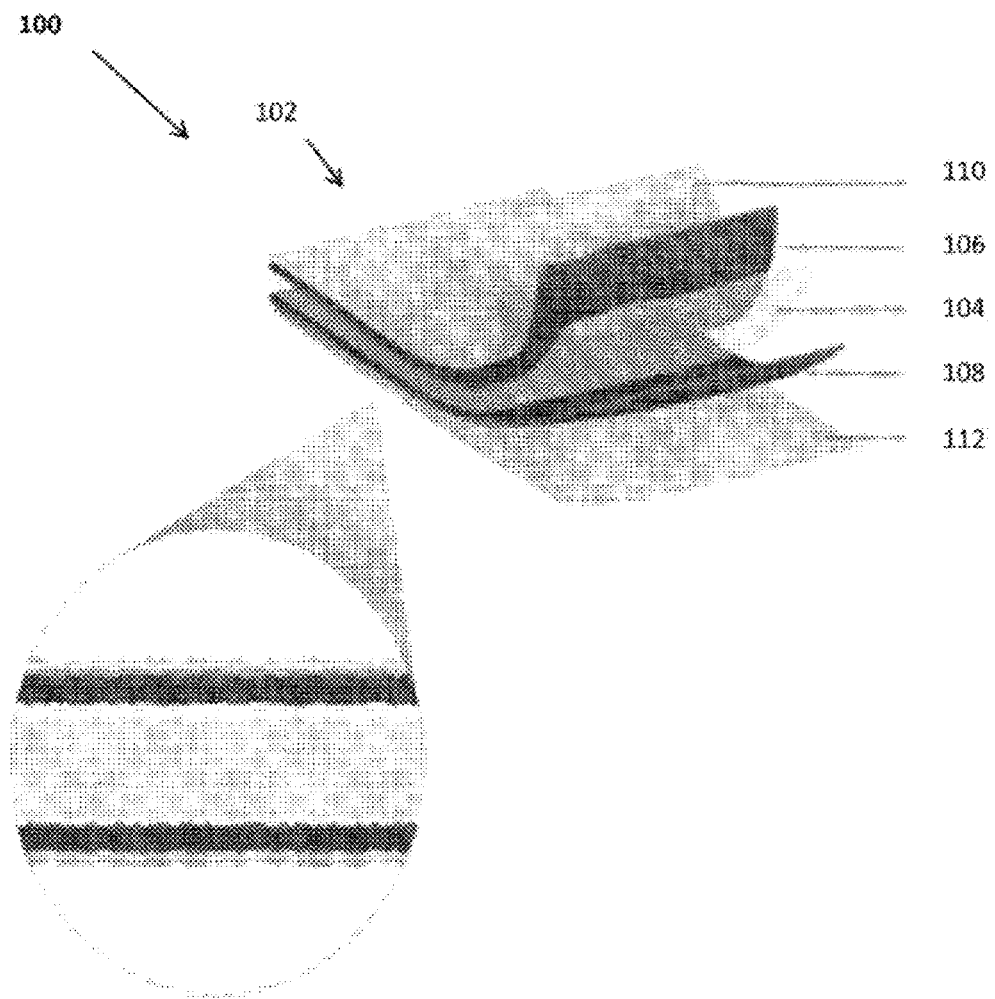
FIG. 1 is a drawing depicting an electroactive polymer device and a circular cross-sectional view of the electroactive polymer device.

FIG. 1 illustrates an example electroactive polymer device 100 that may be operated using the described methods. Electroactive polymer device 100 may include an electroactive polymer laminate structure 102. Electroactive polymer laminate structure 102 may include an electroactive polymer layer 104, configured, e.g., as an ionic exchange membrane layer. Electroactive polymer laminate structure 102 may include first and second ion conducting binder layers 106, 108, configured, for example, as metal oxide/ion conducting binder layers. Electroactive polymer laminate structure 102 may include first and second electrodes 110, 112. Electroactive polymer layer 104, first and second ion conducting binder layers 106, 108, and first and second electrodes 110, 112 may be operatively and electrically coupled to form electroactive polymer laminate structure 102 in example electroactive polymer device 100.

The electroactive polymer layer 104 may include ionic EAPs, such that electroactive polymer laminate structure 102 forms an ionic polymer metal composite (IPMC). Suitable ionic EAPs may include, for example, ionic gels (e.g., PAMPS, poly(vinyl alcohol) gel with dimethyl sulfoxide, and polyacrylonitrile with conductive fibers), conductive polymers (e.g., polypyrrole, polyethylenedioxythiophene, poly-(p-phenylene vinylene), polyaniline, and polythiophene), carbon nanotubes (e.g., single- and multi-walled carbon nanotubes), and electro-rheological fluids (e.g., polymer particles in fluorosilicone base oil). Other polymers may include, for example, fluoropolymer ion exchange membranes such as perfluorosulfonates (e.g., NAFION®, Dupont, Wilmington, Del.), perfluorocarboxylates (e.g., FLEMION®, Asahi Glass, Tokyo, Japan), and perfluorosulfonic acids (e.g., ACIPLEX® (Asahi Kasei Chemicals Corporation, Tokyo, Japan). Cations may include, for example, tetra-n-butylammonium, lithium cation, and sodium cation. Suitable metals for electrodes may include, for example, platinum and gold. Other suitable EAPs may be found at Aliev, et al., "Superelastic Carbon Nanotube Aerogel Muscles," *Science* 2009, 323 (5921), 1575-1578, which is incorporated by reference herein in its entirety.

Figure 2:
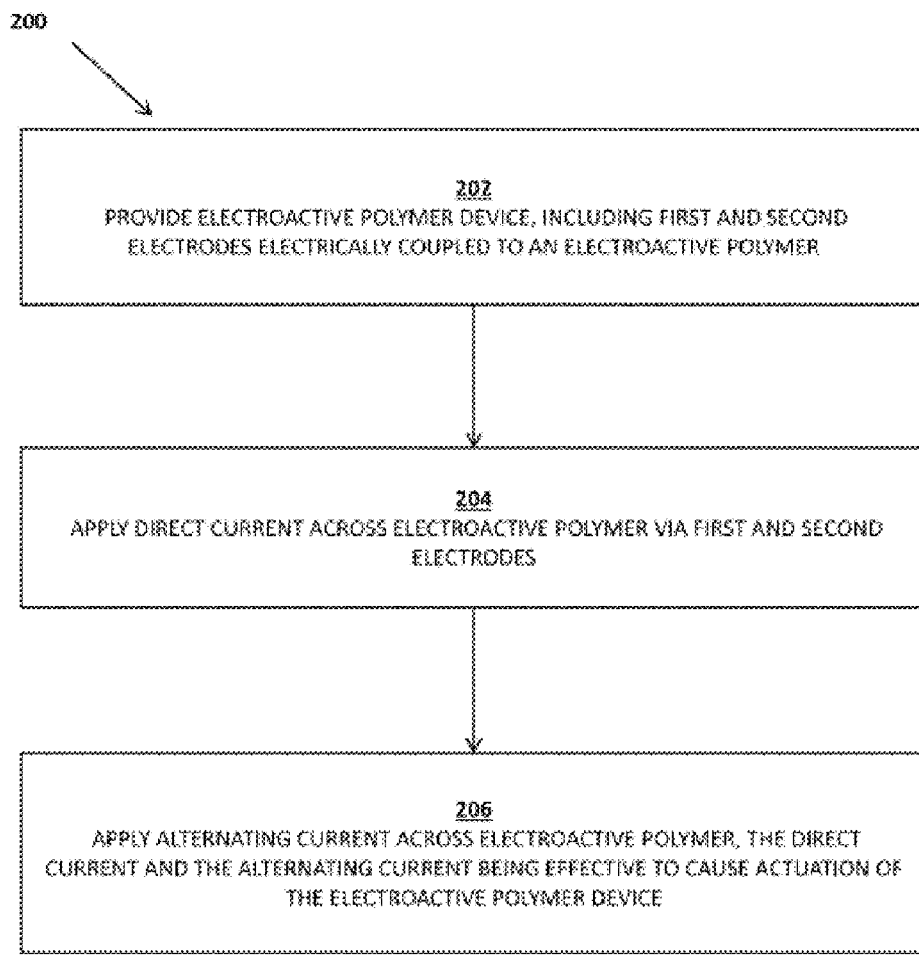
FIG. 2 is a flow diagram describing an example method for controlling an electroactive polymer device.
Figure 3:
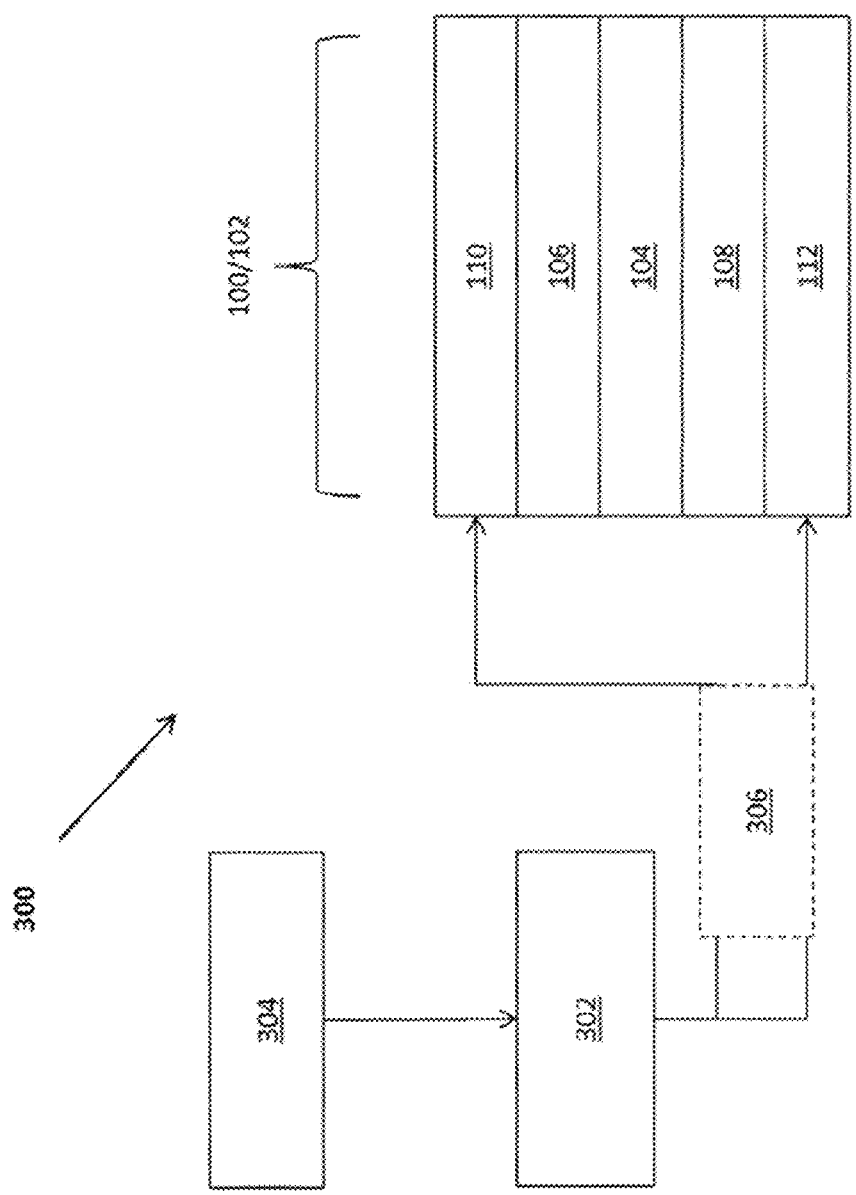
FIG. 3 is a block diagram depicting an example electroactive polymer actuator system.

In various embodiments, a method 200 for actuating an electroactive polymer device is provided. FIG. 2 is a flow diagram depicting aspects of method 200. Method 200 may include 202 providing the electroactive polymer device. The electroactive polymer device may include a first electrode and a second electrode electrically coupled to an electroactive polymer. For example, an electroactive polymer device 100 may include a first electrode 110 and a second electrode 112 electrically coupled to an electroactive polymer layer 104. Method 200 may include 204 applying a direct current across the electroactive polymer via the first and second electrodes. Method 200 may include 206 applying an alternating current across the electroactive polymer. The direct current and the alternating current may be effective to cause actuation of the electroactive polymer device.

In some embodiments, the direct current and the alternating current may be effective to cause actuation of the electroactive polymer device to exert a greater force compared to actuation of the electroactive polymer device using the direct current alone. The applying the alternating current across the electroactive polymer layer may include applying the alternating current across the electroactive polymer layer via the first and second electrodes. The applying the alternating current across the electroactive polymer layer may include inducing the alternating current in the electroactive polymer layer.

In several embodiments, the direct current may be applied at a voltage in VDC including one of: 0.1, 0.2, 0.3, 0.4, 0.5, 0.6, 0.7, 0.8, 0.9, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.5, 7, 7.5, 8, 8.5, 9, 9.5, 10, or a range between, between about, or including any two of the preceding values, for example: between about 0.5 VDC and about 10 VDC; between about 1 VDC and about 5 VDC; between about 2.5 VDC and about 3.5 VDC; or about 3 VDC.

In various embodiments, direct current may be applied at a voltage in VDC. The alternating current may be applied at a voltage amplitude in VAC. An absolute value of a ratio of the voltage in VDC divided by the voltage amplitude in VAC may be at least about 3:1.

In some embodiments, the alternating current may be applied at a voltage amplitude in VAC including one of: 0.001, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.5, 7, 7.5, 8, 8.5, 9, 9.5, 10, or a range between, between about, or including any two of the preceding values, for example: between about 1 mVAC and about 10 VAC; between about 10 mVAC and about 1 VAC; or between about 100 mVAC and about 1 VAC.

In several embodiments, the direct current may be applied at a voltage in VDC and the alternating current may be applied at a voltage amplitude in VAC. An absolute value of a ratio of the voltage in VDC divided by the voltage amplitude in VAC may be, be about, or be at least about 3:1, 4:1, 5:1, 6:1, 7:1, 8:1, 98:1, 10:1, 15:1, 20:1, 25:1, 35:1, 50:1, 75:1, 100:1, 200:1, 300:1, 400:1, 500:1, 600:1, 700:1, 900:1, or 1000:1, for example, at least about 3:1.

In various embodiments, the alternating current may be applied at an AC frequency in Hz that is or is about: 10, 20, 30, 40, 50, 60, 70, 80, 100, 200, 300, 400, 500, 600, 700, 800, 900, 1,000, 1,250, 1,500, 1,750, 2,000, 2,500, 3,000, 3,500, 4,000, 5,000, 7,500, 10,000, 50,000, 100,000, 250,000, 500,000, 750,000, 1,000,000, 1,500,000, or 2,000,000, or a range between, between about, or including any two of the preceding values, for example: between about 10 Hz and about 2 MHz.; between about 100 Hz and about 1 MHz; between about 300 Hz and about 3 kHz; or between about 400 Hz and about 2 kHz.

In some embodiments, the electroactive polymer device may be characterized by a capacitance. The capacitance may be characterized by a resonant frequency. The alternating current may be applied at an AC frequency selected to at least partly couple with the resonant frequency. The alternating current may be applied at the AC frequency. The AC frequency may be at least intermittently at the resonant frequency. In some embodiments, a ratio of the AC frequency to the resonant frequency may be between about 9:10 and about 11:10

In several embodiments, the method may include determining one or both of the capacitance and the resonant frequency characteristic of the capacitance. For example, the method may include determining the capacitance including determining an impedance of the electroactive polymer device. The impedance value may be determined at a corresponding frequency. The method may include calculating the capacitance according to:

$$C = \frac{1000}{L_t * w * \mathrm{Im}(Z) * \omega}$$

wherein: C is the at least one capacitance value in mF/cm²; $L_t$ is a total length in cm of the electroactive polymer layer in the electroactive polymer device; w is a width in cm of the electroactive polymer layer; Im(Z) is an imaginary part of the impedance value; and ω is the corresponding frequency in radians per second. Determining the capacitance may include determining a plurality of the impedance values at a corresponding plurality of frequencies and calculating a corresponding plurality of initial capacitance values. The initial capacitance values may be statistically combined the capacitance, for example, to determine the capacitance as an average, mean, median, and the like of the corresponding plurality of initial capacitance values.

In various embodiments, determining the resonant frequency characteristic of the capacitance may include determining the capacitance as a function of frequency. Determining the resonant frequency characteristic of the capacitance may include determining the resonant frequency according to a peak in the capacitance as a function of frequency.

In some embodiments, the alternating current may be applied at the AC frequency. The AC frequency may be at least intermittently at the resonant frequency. In some embodiments, a ratio of the AC frequency to the resonant frequency may be between about 9:10 and about 11:10. The alternating current may be applied with a waveform. The waveform may include one or more of: a square waveform; a sinusoidal waveform; a triangular waveform; and a sawtooth waveform. The electroactive polymer device may include a power supply configured to provide the direct current and the alternating current. The applying the direct current and the applying the alternating current may include controlling the power supply.

In several embodiments, the electroactive polymer device may include an ionic polymer metal composite. The electroactive polymer device may include a electroactive polymer layer that may be an ionic electroactive polymer layer. The ionic electroactive polymer layer may include one or more of: an ionic gel; a conductive polymer; carbon nanotubes in an ionic liquid; an ionic fluoropolymer; and an electro-rheological fluid. The ionic electroactive polymer layer may include one or more of: a perfluorosulfonic acid; a perfluorosulfonate; and a perfluorocarboxylate. The ionic electroactive polymer layer may include one or more of: poly 2-acrylamido-2-methyl-1-propanesulfonic acid; poly (vinyl alcohol); poly(vinyl alcohol) gel with dimethyl sulfoxides; polyacrylonitrile with conductive fibers; polypyrrole; polyethylenedioxythiophene; poly-(p-phenylene vinylene); polyaniline; polythiophene; single-walled and/or multi-walled carbon nanotubes in an ionic liquid; and an electro-rheological fluid including polymer particles in fluorosilicone oil. The ionic electroactive polymer layer may include ionic species including one or more of: tetra-n-butylammonium cation; lithium cation; and sodium cation. The ionic electroactive polymer layer may include an ionic liquid.

In some embodiments, the electroactive polymer device may include an electroactive polymer laminate structure. The electroactive polymer laminate structure may include a first ion conducting binder layer and a second ion conducting binder layer. The electroactive polymer laminate structure may include an electroactive polymer layer. The electroactive polymer layer may be laminated between the first and second ion conducting binder layers. The electroactive polymer laminate structure may include a first conductor layer and a second conductor layer laminating the first and second ion conducting binder layers and the electroactive polymer layer between. The electroactive polymer layer, the first and second ion conducting binder layers, and the first and second conductor layers may be operatively coupled to form the electroactive polymer laminate structure.

In several embodiments, the ion conducting binder layers may independently or jointly, e.g., independently, include an oxide of one or more of: V, Cr, Mn, Fe, Co, Ni, Cu, Zn, Al, Ru, Rh, Pd, Ag, Cd, Re, Os, Ir, Pt, Au, Hg, and Pb. For example, the ion conducting binder layers may independently or jointly, e.g., independently, include an oxide of one or more of: V, Mn, Co, Ni, Cu, Ru, Rh, Pd, Ag, Re, Os, Ir, and Pt. Examples may include $MnO_2$, $CoO_x$, NiO, cobalt-nickel oxide, $RuO_2$, or $IrO_2$. In some embodiments, "an oxide of one or more of: the mentioned metal oxides includes combinations, compounds, composites, mixtures, and the like, e.g., cobalt-nickel oxide.

In some embodiments, the conductor layers may independently or jointly, e.g., independently, include one or more of: V, Cr, Mn, Fe, Co, Ni, Cu, Zn, Al, Pd, Ag, Cd, Ir, Pt, Au, or Pb. For example, the conductor layers may independently or jointly, e.g., independently, include one or more of: Cr, Fe, Co, Ni, Cu, Al, Ag, Pt, or Au. In several embodiments, "one or more of" the mentioned metals may include combinations, compounds, composites, mixtures, alloys, and the like, e.g., chromium-gold.

In various embodiments, the method may include controlling one or more of: a moisture content of the electroactive polymer device and a humidity level of an environment in which the electroactive polymer device is actuated. Controlling moisture or humidity may be accomplished, e.g., by sealing or containing the electroactive polymer device in a membrane or an enclosure. Moisture or humidity may be controlled, for example, using a condenser, a heater, a moisture sensor, a desiccant, a moisture reservoir, a gas source such as a fan or gas tank, and the like.

In various embodiments, an electroactive polymer actuator system 300 is provided. Electroactive polymer actuator system 300 may include an electroactive polymer device 100. Electroactive polymer device 100 may include a first electrode 110 and a second electrode 112 electrically coupled to an electroactive polymer layer 104. Electroactive polymer actuator system 300 may include a power supply 302 operatively coupled to first and second electrodes 110, 112. Electroactive polymer actuator system 300 may include a controller 304. Controller 304 may be programed with instructions. The instructions may be configured for carrying out any of the method steps described herein. For example, the instructions may be configured for controlling power supply 302 to apply a direct current across electroactive polymer layer 104 via first and second electrodes 110, 112. The instructions may be configured for controlling power supply 302 to apply an alternating current across electroactive polymer layer 104.

In some embodiments, the direct current and the alternating current may be applied effective to cause actuation of electroactive polymer device 100. The direct current and the alternating current may be effective to cause actuation of electroactive polymer device 100 to exert a greater force compared to actuation of electroactive polymer device 100 using the direct current alone.

In several embodiments, controller 304 may be programed with instructions for controlling power supply 302 to apply the direct current at a voltage in VDC that may include one of: 0.1, 0.2, 0.3, 0.4, 0.5, 0.6, 0.7, 0.8, 0.9, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.5, 7, 7.5, 8, 8.5, 9, 9.5, 10, or a range between, between about, or including any two of the preceding values, for example: between about 0.5 VDC and about 10 VDC; between about 1 VDC and about 5 VDC; between about 2.5 VDC and about 3.5 VDC; or about 3 VDC.

In various embodiments, controller 304 may be programed with instructions for controlling power supply 302 to apply the direct current at a voltage in VDC and the alternating current at a voltage amplitude in VAC such that an absolute value of a ratio of the voltage in VDC divided by the voltage amplitude in VAC may be, be about, or be at least about 3:1, 4:1, 5:1, 6:1, 7:1, 8:1, 98:1, 10:1, 15:1, 20:1, 25:1, 35:1, 50:1, 75:1, 100:1, 200:1, 300:1, 400:1, 500:1, 600:1, 700:1, 900:1, or 1000:1, for example, at least about 3:1.

In some embodiments, controller 304 may be programed with instructions for controlling power supply 302 to apply the alternating current at a voltage amplitude in VAC that may include one of: 0.001, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.5, 7, 7.5, 8, 8.5, 9, 9.5, 10, or a range between, between about, or including any two of the preceding values, for example: between about 1 mVAC and about 10 VAC; between about 10 mVAC and about 1 VAC; or between about 100 mVAC and about 1 VAC.

In several embodiments, controller 304 may be programed with instructions for controlling power supply 302 to apply the alternating current at an AC frequency in Hz that is or is about: 10, 20, 30, 40, 50, 60, 70, 80, 100, 200, 300, 400, 500, 600, 700, 800, 900, 1,000, 1,250, 1,500, 1,750, 2,000, 2,500, 3,000, 3,500, 4,000, 5,000, 7,500, 10,000, 50,000, 100,000, 250,000, 500,000, 750,000, 1,000,000, 1,500,000, or 2,000,000, or a range between, between about, or including any two of the preceding values, for example: between about 10 Hz and about 2 MHz.; between about 100 Hz and about 1 MHz; between about 300 Hz and about 3 kHz; or between about 400 Hz and about 2 kHz.

In various embodiments, electroactive polymer device 100 may be characterized by a capacitance. The capacitance may be characterized by a resonant frequency. Controller 304 may be programed with instructions for controlling power supply 302 to apply the alternating current at an AC frequency selected to at least partly couple with the resonant frequency.

In some embodiments, electroactive polymer actuator system 300 may include an impedance sensor 306. Impedance sensor 306 may be operatively coupled to controller 304, and/or power supply 302. Controller 304 may be programmed with instructions for controlling impedance sensor 306 and power supply 302 to determine a capacitance of electroactive polymer device 100 and the resonant frequency characteristic of the capacitance.

In several embodiments, controller 304 may be programed with instructions for controlling impedance sensor 306 and power supply 302 to determine the capacitance. For example, the instructions may include determining an impedance of electroactive polymer device 100 using impedance sensor 306. The impedance value may be determined at a corresponding frequency. The instructions may include calculating the capacitance according to:

$$C = \frac{1000}{L_t * w * \text{Im}(Z) * \omega}$$

wherein: C is the at least one capacitance value in mF/cm$^2$; $L_t$ is a total length in cm of electroactive polymer layer 104 in electroactive polymer device 100; w is a width in cm of electroactive polymer layer 104; Im(Z) is an imaginary part of the impedance value; and $\omega$ is the corresponding frequency in radians per second. Determining the capacitance may include determining a plurality of the impedance values at a corresponding plurality of frequencies and calculating a corresponding plurality of initial capacitance values. The initial capacitance values may be statistically combined the capacitance, for example, to determine the capacitance as an average, mean, median, and the like of the corresponding plurality of initial capacitance values.

In various embodiments, the instructions to determine the resonant frequency characteristic of the capacitance may include determining the capacitance as a function of frequency. The instructions may include determining the resonant frequency according to a peak in the capacitance as a function of frequency.

In some embodiments, controller 304 may be programmed with instructions for applying the alternating current at the AC frequency. The AC frequency may be at least intermittently at the resonant frequency. The instructions may include applying the alternating current at the AC frequency. A ratio of the AC frequency to the resonant frequency may be between about 9:10 and about 11:10.

In several embodiments, electroactive polymer device 100 may be characterized by a capacitance. The capacitance may be characterized by a resonant frequency. Controller 304 may be programmed with instructions for applying the alternating current at least intermittently at an AC frequency. The AC frequency may be in a ratio to the resonant frequency of between about 9:10 and about 11:10.

In various embodiments, controller 304 may be programed with instructions for controlling power supply 302 to apply the alternating current with a waveform including one or more of: a square waveform; a sinusoidal waveform; a triangular waveform; and a sawtooth waveform.

In some embodiments, electroactive polymer device 100 may be configured as an ionic polymer metal composite. For example, electroactive polymer device 100 may include electroactive polymer layer 104 that may be an ionic electroactive polymer layer. Ionic electroactive polymer layer may include one or more of: an ionic gel; a conductive polymer; carbon nanotubes in an ionic liquid; an ionic fluoropolymer; and an electro-rheological fluid. Ionic electroactive polymer layer may include one or more of: a perfluorosulfonic acid; a perfluorosulfonate; and a perfluorocarboxylate. Ionic electroactive polymer layer may include one or more of: poly 2-acrylamido-2-methyl-1-propanesulfonic acid; poly(vinyl alcohol); poly(vinyl alcohol) gel with dimethyl sulfoxides; polyacrylonitrile with conductive fibers; polypyrrole; polyethylenedioxythiophene; poly-(p-phenylene vinylene); polyaniline; polythiophene; single-walled and/or multi-walled carbon nanotubes in an ionic liquid; and an electro-rheological fluid including polymer particles in fluorosilicone oil. Ionic electroactive polymer layer may include ionic species including one or more of: tetra-n-butylammonium cation; lithium cation; and sodium cation. Ionic electroactive polymer layer may include an ionic liquid.

In various embodiments, electroactive polymer device 100 may include an electroactive polymer laminate structure 102. Electroactive polymer laminate structure 102 may include a first ion conducting binder layer 106 and a second ion conducting binder layer 108. Electroactive polymer laminate structure 102 may include an electroactive polymer layer 104. Electroactive polymer layer 104 may be laminated between the first and second ion conducting binder layers 106, 108. Electroactive polymer laminate structure 102 may include a first electrode 110 and a second electrode 112 laminating first and second ion conducting binder layers 106, 108 and electroactive polymer layer 104 between. Electroactive polymer layer 104, first and second ion conducting binder layers 106, 108, and first and second electrodes 110, 112 may be operatively coupled to form electroactive polymer laminate structure 102.

In several embodiments, ion conducting binder layers 106, 108 may independently or jointly, e.g., independently, include an oxide of one or more of: V, Cr, Mn, Fe, Co, Ni, Cu, Zn, Al, Ru, Rh, Pd, Ag, Cd, Re, Os, Ir, Pt, Au, Hg, and Pb. For example, ion conducting binder layers 106, 108 may independently or jointly, e.g., independently, include an oxide of one or more of: V, Mn, Co, Ni, Cu, Ru, Rh, Pd, Ag, Re, Os, Ir, and Pt. Examples may include MnO$_2$, CoO$_x$, NiO, cobalt-nickel oxide, RuO$_2$, or IrO$_2$. In some embodiments, "an oxide of" one or more of the mentioned metal oxides includes combinations, compounds, composites, mixtures, and the like, e.g., cobalt-nickel oxide.

In some embodiments, first and second electrodes 110, 112 may independently or jointly, e.g., independently, include one or more of: V, Cr, Mn, Fe, Co, Ni, Cu, Zn, Al, Pd, Ag, Cd, Ir, Pt, Au, and Pb. For example, first and second electrodes 110, 112 may independently or jointly, e.g., independently, include one or more of: Cr, Fe, Co, Ni, Cu, Al, Ag, Pt, and Au. In several embodiments, "one or more of" the mentioned metals may include combinations, compounds, composites, mixtures, alloys, and the like, e.g., chromium-gold.

In various embodiments, electroactive polymer actuator system 300 may include a moisture or humidity control device (not shown). A "moisture or humidity control device" is any device capable of at least partially controlling a moisture level of electroactive polymer actuator system 300 or capable of at least partially controlling a humidity level of an environment in which electroactive polymer actuator system 300 is actuated. The "moisture or humidity control device" may be in contact with, may surround, may be incorporated in, may be located near, or may otherwise be operatively coupled to electroactive polymer actuator system 300 to perform a moisture or humidity controlling function. Example moisture or humidity control devices may include one or more of: a seal, a membrane, an enclosure, a condenser, a heater, a moisture sensor, a desiccant, a moisture reservoir, a gas source such as a fan or gas tank, and the like.

EXAMPLES

Example 1

Construction of an EAP Device

Two EAP devices configured as IPMCs were constructed as follows. An electrode ink formulation was prepared by combining 0.3 g $RuO_2$, 0.2 g $H_2O_2$, 3.0 g of 5 wt % NAFION® solution, and 1.5 g t-butyl alcohol, followed by stirring overnight. Decal-supported electrodes were formed by painting about 12 layers of the electrode ink on glass reinforced polytetrafluoroethylene (PTFE) decals. Each layer was dried under infrared heat before applying the next layer.

The decal-supported electrodes were applied to form an assembly, one to each side of an N115 Na+ NAFION® membrane using a hot press at 210° C. and 500 psig for 3 min, followed by cooling under pressure in the press. Once cooled, the assembly was removed from the press and the decals were peeled away to leave the electrodes as ink layers on the N115 Na+ form. An exterior gold coating was applied to the electrodes by vacuum evaporation deposition. First, the electrodes were pre-cleaned using an argon ions. An initial 20 nm layer of chromium was evaporated on the electrode. A final layer of 100 nm of gold was evaporated on top of the initial chromium layer. The process was repeated on the other side of the EAP device.

One EAP device, labeled Variation 1, was infused with an ionic liquid 1-ethyl-3-methylimidazolium trifluoro-methanesulfonate (CAS 145022-44-2, Sigma-Aldrich, St Louis Mo.) was infused into the membrane. Another EAP device, Variation 2, was prepared with a dry membrane (no ionic liquid). The composition details of Variation 1 and Variation 2 are shown in Table 1 in FIG. 4.

Example 2

Characterization of Dc-Only Actuation

Experimental tests were run on example actuators of the type described in EXAMPLE 1 to characterize the magnitude and speed of deflection corresponding to applied voltages from 1-4 VDC.

Figure 5:
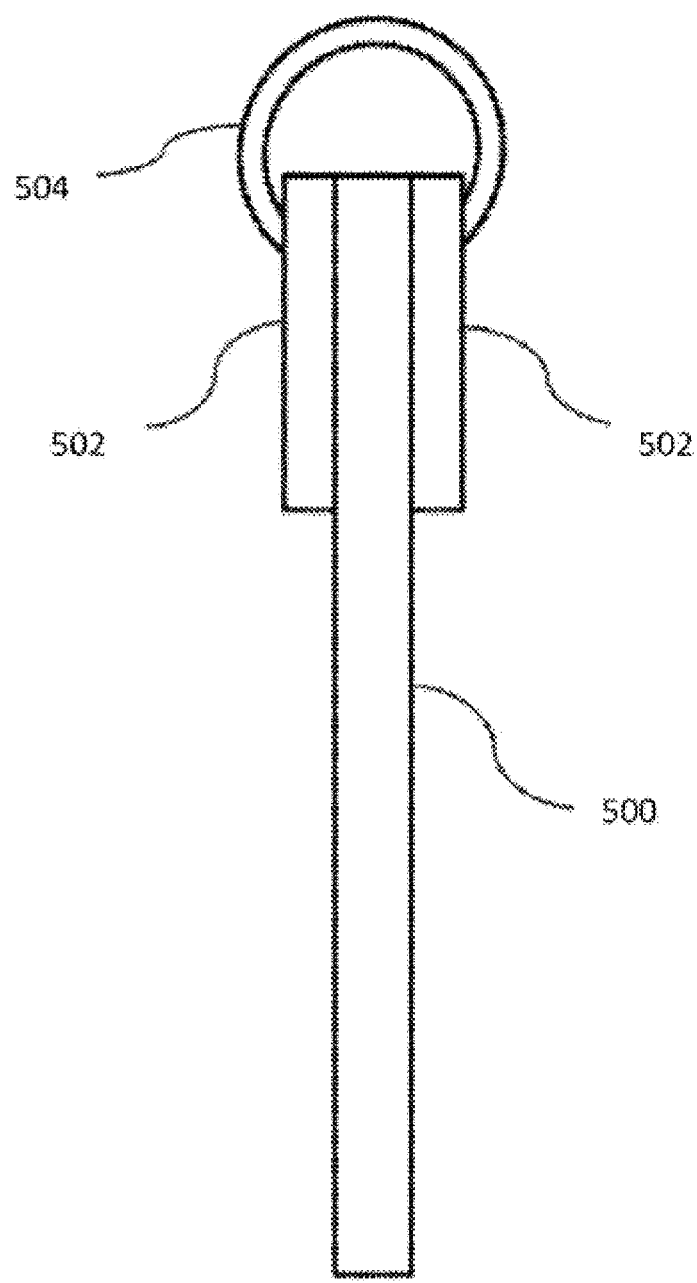
FIG. 5 illustrates an example configuration of an EAP actuator.
Figure 6A:
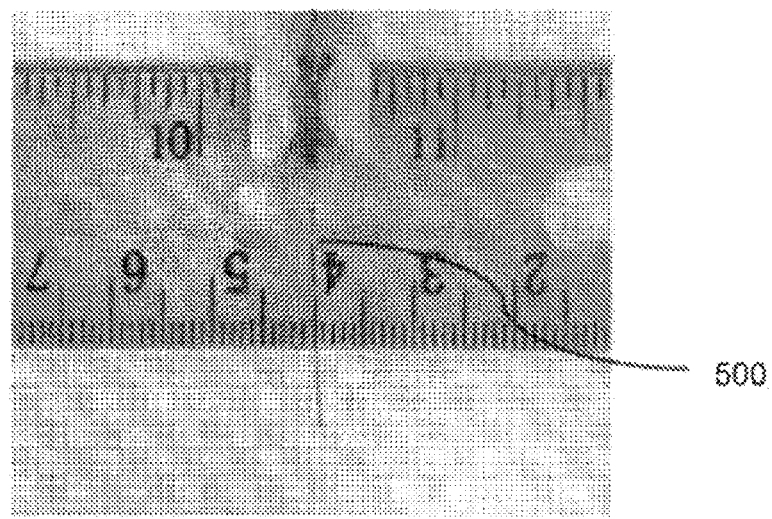
FIG. 6A illustrates an example EAP actuator before applying voltage.
Figure 6B:
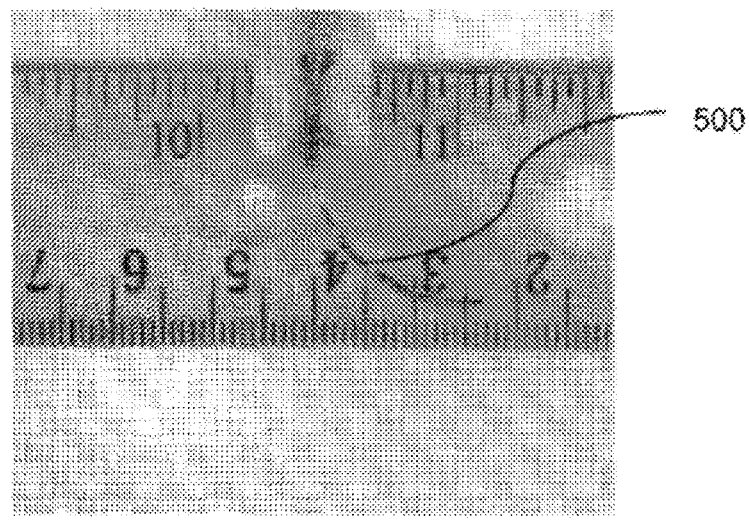
FIG. 6B illustrates an example EAP actuator after applying voltage.

FIG. 5 illustrates an example configuration of an actuator 500, electrodes 502, and an electrode clamp 504. FIG. 6A illustrates actuator 500 in its initial position before applying voltage. FIG. 6B illustrates actuator 500 during the application of voltage. Force tests used the configurations shown in FIGS. 5, 6A, and 6B. In these configurations, one end of the EAP device was held in place by an electrode clamp (e.g., a wooden clothespin). Within the "jaws" of the clamp are two gold-coated silicon chips that contact the opposite faces of the EAP membrane sample. A constant DC potential was applied for 60 seconds between the opposing gold surfaces of the electrode clamp, which caused actuator 500 to actuate.

Figure 7:
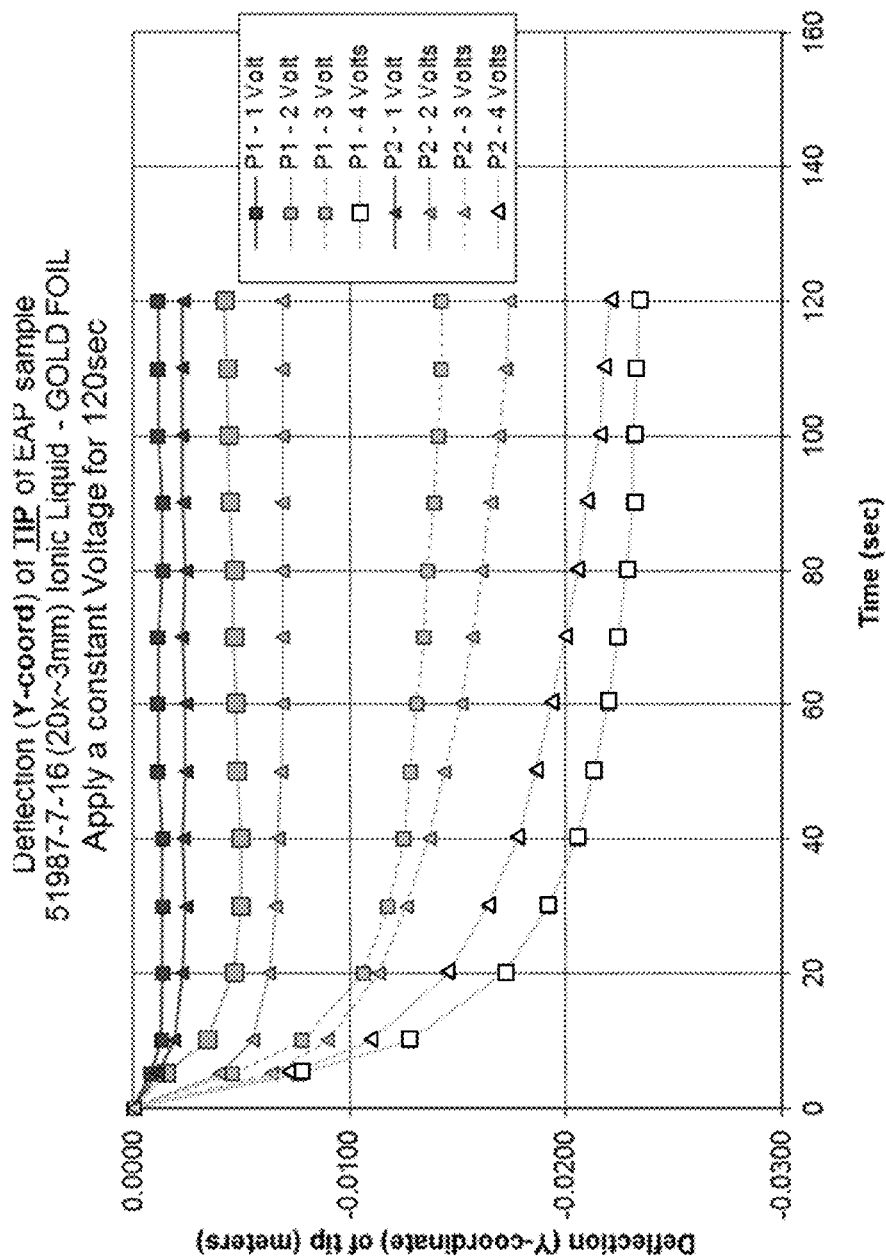
FIG. 7 illustrates deflection versus time data for an example EAP actuator.

FIG. 7 illustrates deflection versus time data for an actuator of type 500 with ionic liquid solvent. Ionic liquid solvents may be particularly suitable for facilitating deflection. The actuator 500 used to generate the results shown in FIG. 7 had the dimensions 20 mm×3 mm.

Figure 8:
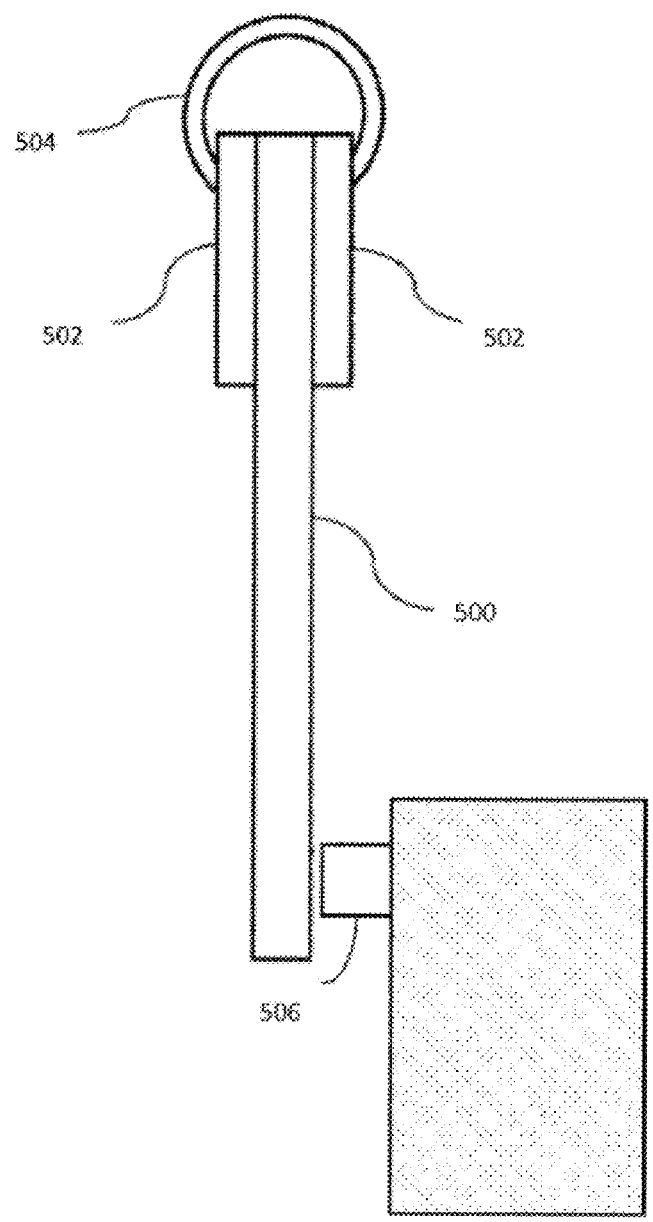
FIG. 8 illustrates an example configuration EAP actuator in a blocked load test set-up.
Figure 9:
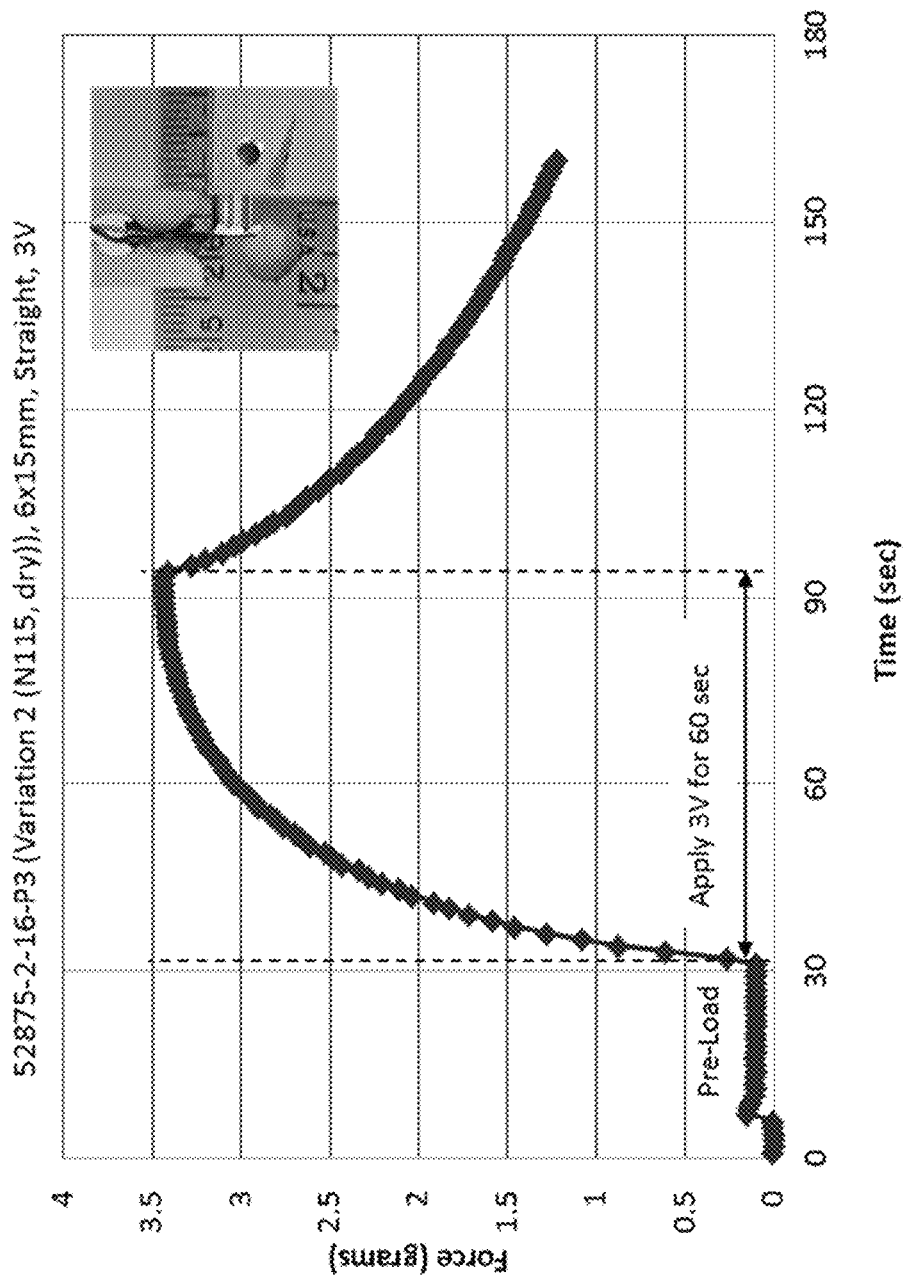
FIG. 9 illustrates blocked force test data.

FIG. 8 illustrates an example configuration of actuator 500, electrodes 502, and electrode clamp 504, in a blocked load test set-up 800. In this test, actuator 500 was rested against a load cell sensor 506 and activated, so that actuator 500 exerted force against sensor 506. In each force test, data recording of the force as a function of time began with actuator 500 not in contact with the load cell sensor. Once data recording of force started, actuator 500 was brought in contact with the load cell sensor 506. A constant DC voltage was then applied for 60 seconds to actuate actuator 500, and data recording ended 60 seconds after the voltage was turned off. This allowed for characterization of both the ramp-up in exerted force with time, as well as the decay of force in actuator 500 after the applied voltage was removed. FIG. 9 illustrates the blocked force test data. As shown in FIG. 9, a 15 mm×6 mm actuator 500 exerts a force of approximately 3.4 g at 3V.

Example 3

Frequency Selection for AC Actuation

Force versus time measurements in EXAMPLE 2 were made using only a DC signal. The example methods were demonstrated using force measurements made with a 3 VDC signal combined with an AC signal at selected AC frequencies.

AC frequencies were selected by two methods. The first method involves finding the capacitance of IPMCs as a function of AC frequency. For a given EAP device, impedance and imaginary impedance were measured at different frequencies using a combination of an Electrochemical Interface (Potentiostat/Galvanostat) (Solartron SI1287, Solartron Analytical, Oak Ridge, Tenn.) and an Impedance/Gain-Phase Analyzer (Frequency Response Analyzer) (Solartron SI1260).

Capacitance was calculated at measured impedance at each frequency according to:

$$C = \frac{1000}{L_t * w * \mathrm{Im}(Z) * \omega}$$

wherein: C is the at least one capacitance value in mF/cm$^2$; $L_t$ is a total length in cm of the electroactive polymer layer in the electroactive polymer device; w is a width in cm of the electroactive polymer layer; Im(Z) is the imaginary part of the impedance value; and ω is the corresponding frequency in radians per second. Capacitance was then plotted versus frequency. Peaks identified in the plot of capacitance vs frequency were investigated as potential resonance frequencies.

Figure 10:
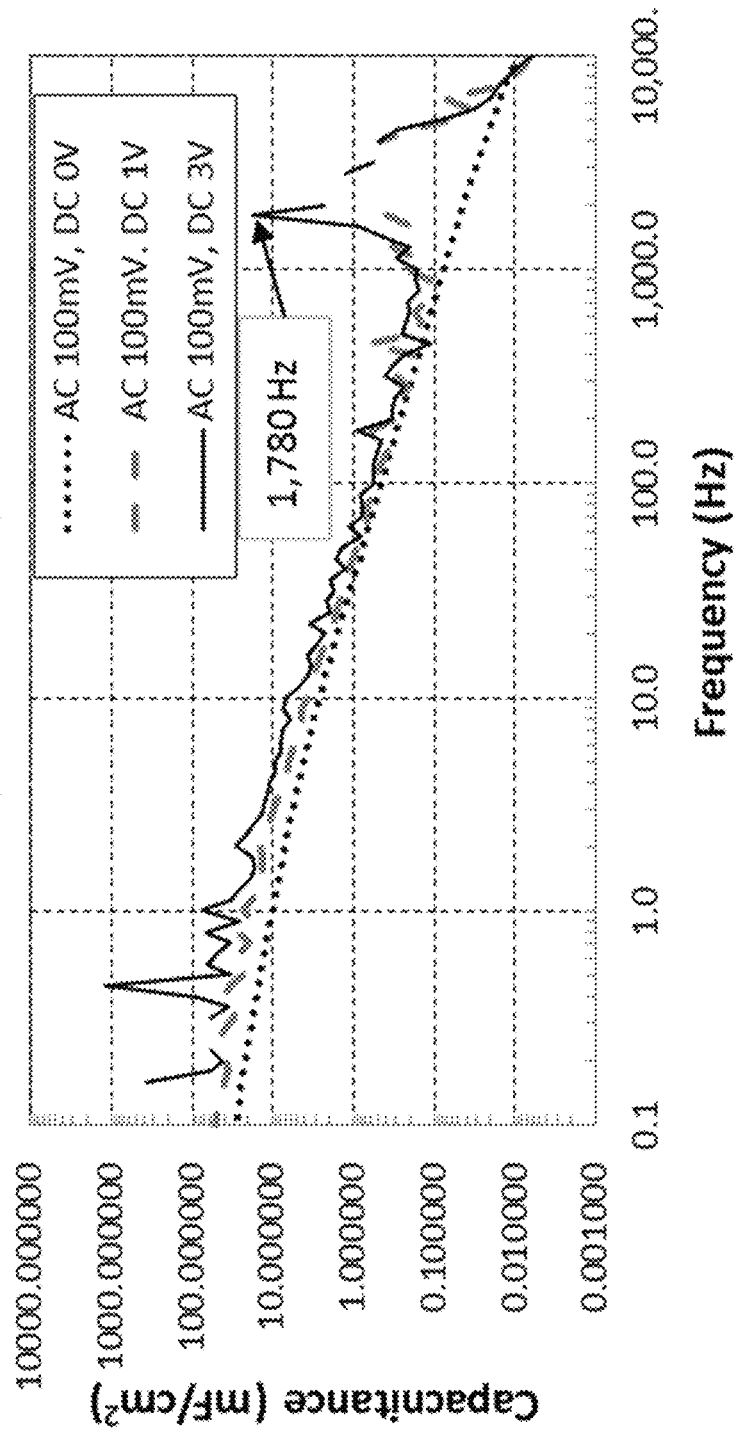
FIG. 10 is a plot of capacitance versus AC frequency for an example EAP device.

FIG. 10 shows the plot of capacitance versus AC frequency for the Variation 1 (N115, ionic liquid) IPMC EAP device. In this figure, a 100 mVAC amplitude was used. In addition, one test involved a straight 100 mVAC signal, while the other two tests involved a 100 mVAC signal with a DC bias of 1 VDC and 3 VDC. As shown in FIG. 10, the Variation 1 (N115, ionic liquid) IPMC EAP device exhibits increasing noise in capacitance as the DC bias increases. A spike at 1,780 Hz was believed to be noise as opposed to a resonance peak. The 1,780 Hz frequency was selected as a frequency of interest for measurements using the Variation 1 (N115, ionic liquid) IPMC EAP device in EXAMPLE 4.

Figure 11:
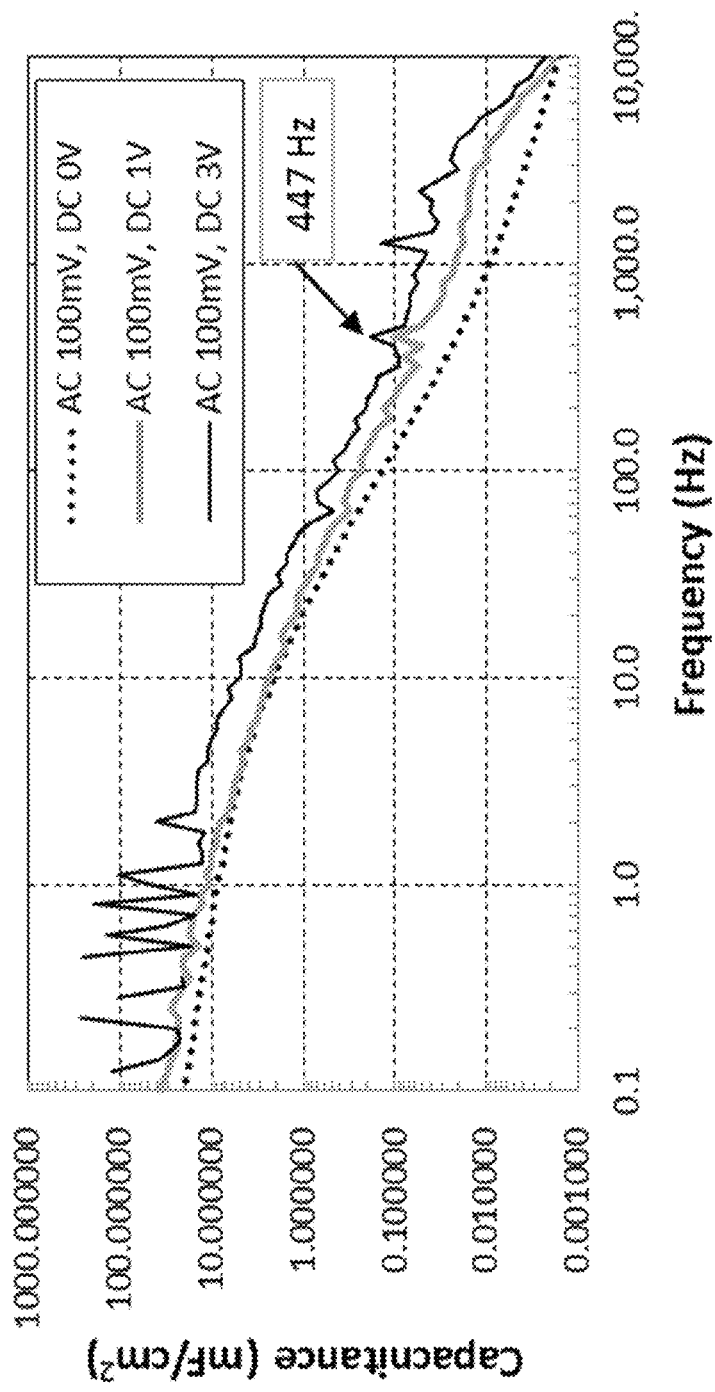
FIG. 11 is a plot of capacitance versus AC frequency for another example EAP device.

FIG. 11 shows an example of a plot of capacitance versus AC frequency for the Variation 2 (N115, dry) IPMC EAP device, using a 100 mVAC amplitude. In addition, one test involved a straight 100 mVAC signal, while the other two tests involved a 100 mVAC signal with a DC bias of 1 VDC and 3 VDC. As shown in FIG. 11, the Variation 2 (N115, dry) IPMC EAP device exhibits increasing noise in capacitance as the DC bias increases. A spike at 447 Hz was believed to be noise as opposed to a resonance peak. The 447 Hz frequency was selected as a frequency of interest for measurements using the Variation 2 (N115, dry) IPMC EAP device in EXAMPLE 4.

A second method for selecting AC frequencies involves systematically choosing frequencies over a large range. The frequencies chosen for this EXAMPLE were 1,000, 10,000, and 1,000,000 Hz.

The AC amplitude chosen for the force tests was 100 mV. A lower amplitude, 10 mVAC, led to increased noise in the impedance measurements. A 1000 mVAC (1 VAC) amplitude would be significant relative to the 3 VDC signal used in this example. Such a low ratio of VDC to VAC would be expected to begin to cause mechanical oscillations in the EAP device.

Example 4

Force Generation Via Combined Dc and Ac Actuation

Force versus time measurements were made with a 3 VDC+AC signal at the selected frequencies (unique frequency from capacitance measurement, and 1,000 Hz, 10,000 Hz, and 1,000,000 Hz). These measurements were compared to a baseline force versus time measurement resulting from a simple 3 VDC signal.

Figure 12A:
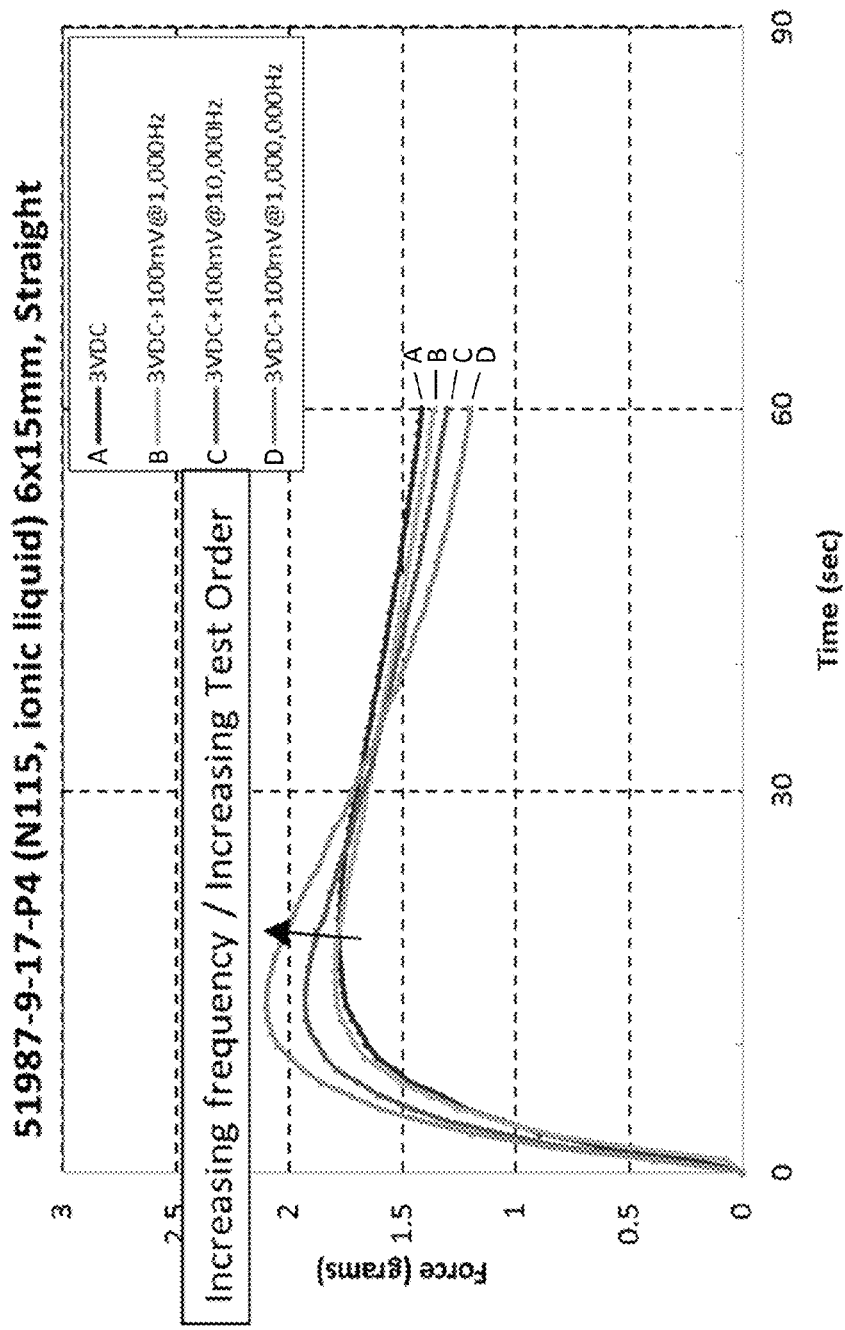
FIG. 12A shows the force versus time measurements for an example EAP device at various AC frequencies.
Figure 12B:
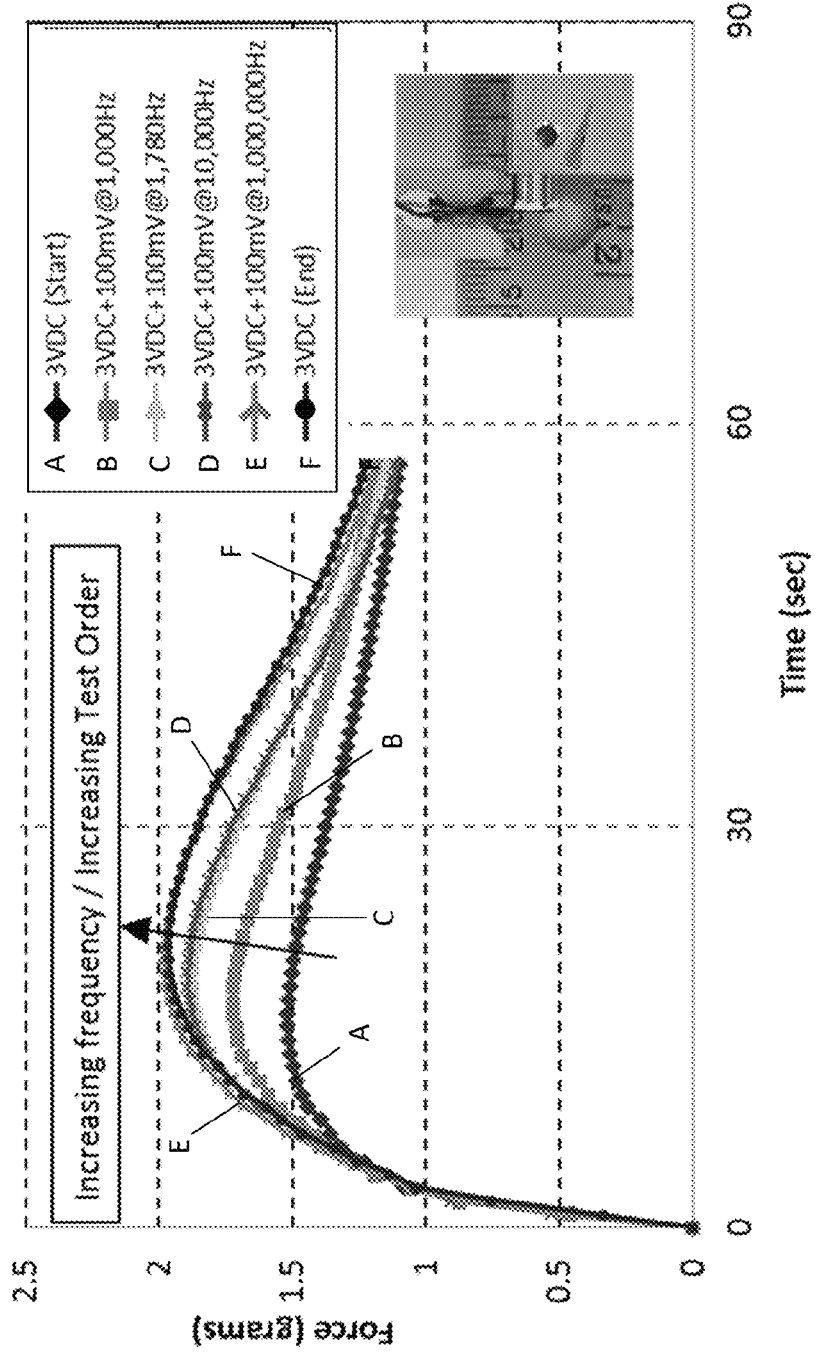
FIG. 12B shows the force versus time measurements for an example EAP device at various AC frequencies.

FIG. 12A and FIG. 12B show the force versus time measurements for the Variation 1 (N115, ionic liquid) IPMC EAP device at the different AC frequencies of interest. For example, FIG. 12A shows a series of tests on Day 1, where humidity was not controlled. After several iterations of testing both Variation 1 and Variation 2, it appeared that daily changes in humidity may influence performance of IPMCs. FIG. 12B shows a series of tests on Day 2, where the sample was allowed to equilibrate in a ~22% relative humidity desiccators for several hours prior to testing.

In each set of tests in FIG. 12A and FIG. 12B, the first test run was the baseline test with a simple 3 VDC signal. As FIG. 12A and FIG. 12B show, progressively larger maximum forces were reached as tests progressed in an order of increasing AC frequency. For example, FIG. 12A shows that the force versus time profile that resulted from the baseline 3 VDC signal reached a maximum of ~1.75 g, whereas the force versus time profile that resulted from the 3 VDC+100 mVAC @ 1,000,000 Hz signal reached a maximum force of ~2.1 g, corresponding to a ~20% increase. FIG. 12B shows that the force versus time profile that resulted from the baseline 3 VDC signal reached a maximum of ~1.5 g, whereas the force versus time profile that resulted from the 3 VDC+100 mVAC @ 1,000,000 Hz signal reached a maximum force of ~1.95 g, corresponding to a ~30% increase. This was surprising because a unique resonance frequency was not discovered earlier.

FIG. 12B shows that a final test was run where the simple 3 VDC signal was used again after the series of tests that included an AC frequency. This shows that the final 3 VDC test had a force versus time profile similar to the test that preceded it (3 VDC+100 mVAC @ 1,000,000 Hz). The sample did not return to the original 3 VDC profile, which may be an example of hysteresis related to running multiple experiments on the same EAP device.

Figure 13A:
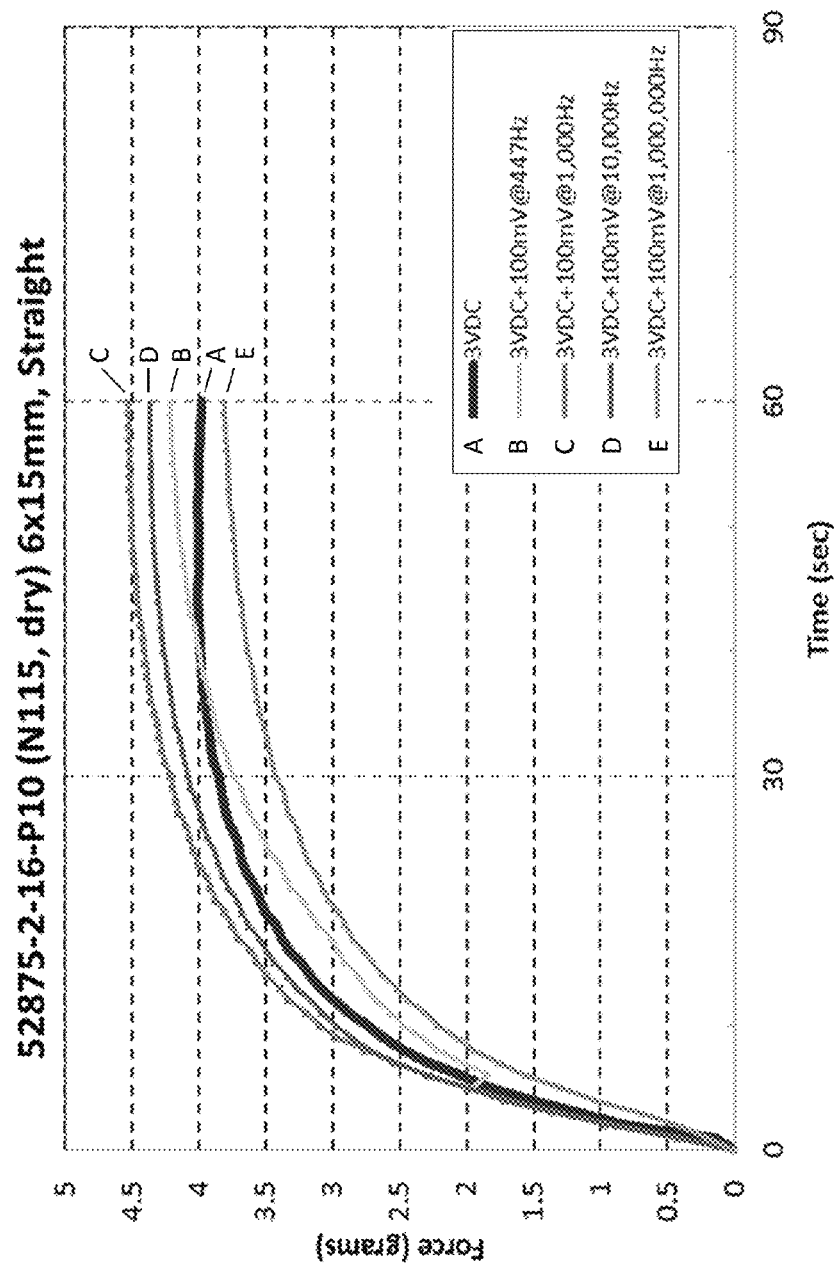
FIG. 13A shows the force versus time measurements for another example EAP device at various AC frequencies.
Figure 13B:
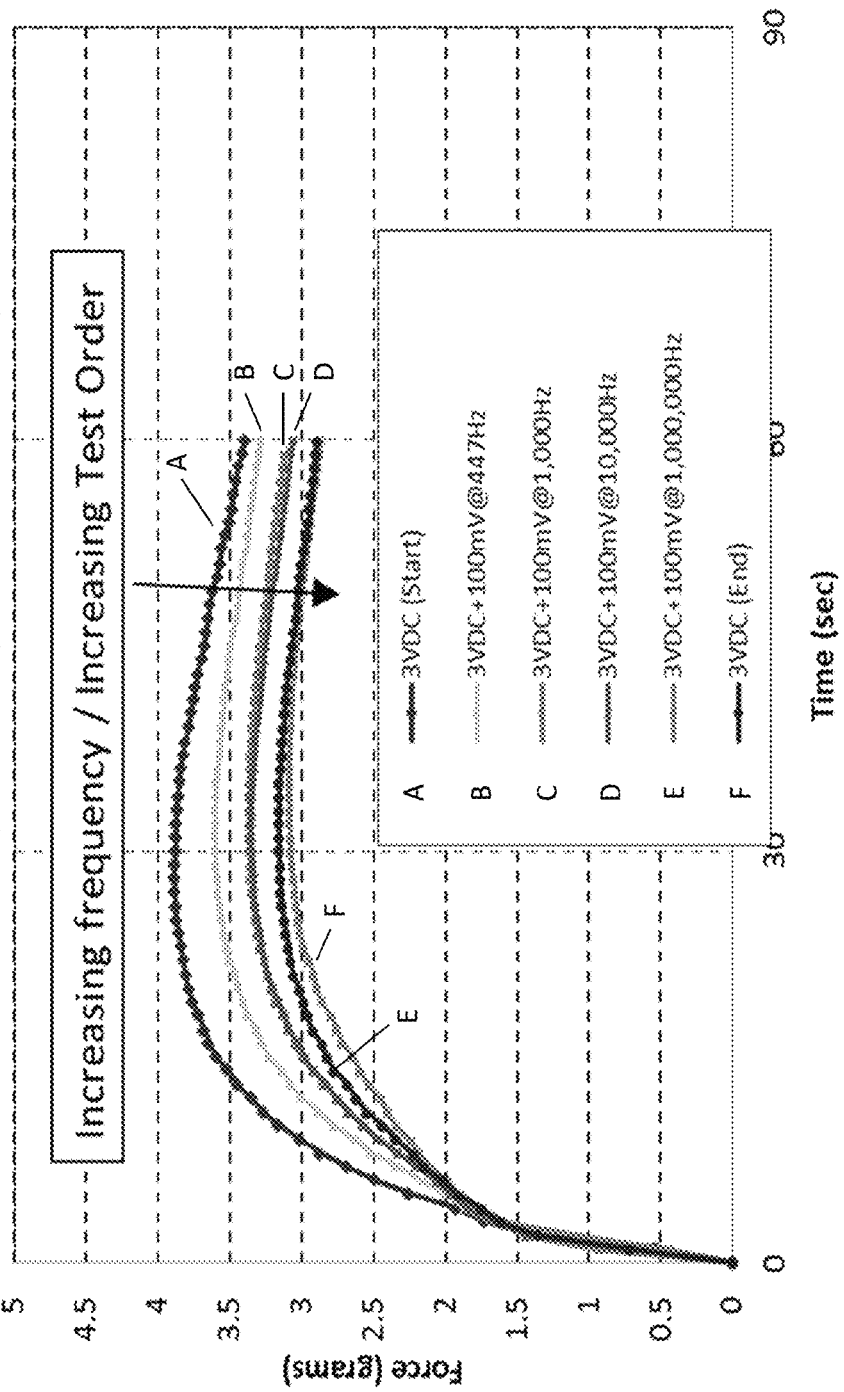
FIG. 13B shows the force versus time measurements for an example EAP device at various AC frequencies.
Figure 13C:
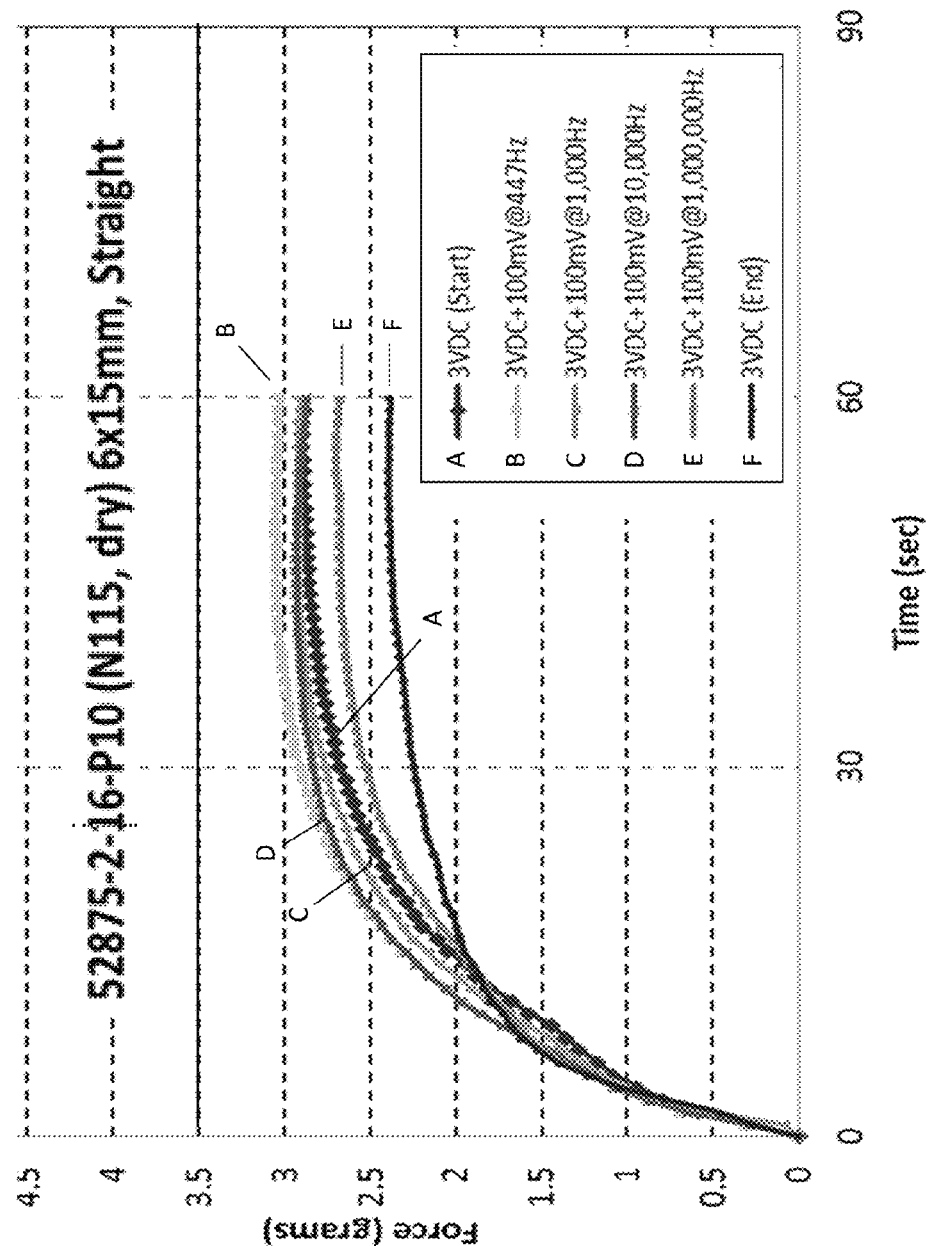
FIG. 13C shows the force versus time measurements for an example EAP device at various AC frequencies.

FIGS. 13A, 13B, and 13C show the force versus time measurements for the Variation 2 (N115, dry) IPMC EAP device at the different AC frequencies of interest. FIG. 13A shows a series of tests on Day 1, where humidity was not controlled. FIG. 13B shows a series of tests on Day 2, where the humidity was also not controlled, but ambient humidity was higher than on other days of testing. Similar to FIG. 12B, FIG. 13C shows a series of tests on Day 3, where the Variation 2 (N115, dry) IPMC EAP device was allowed to equilibrate in a ~22% relative humidity desiccator for several hours prior to testing.

Comparing the force versus time curves shown in FIGS. 13A, 13B, and 13C, there does not appear to be a consistent trend of changes in maximum force with changes in the AC frequency, which is believed to be due, at least in part, to the difference in humidity among the experiments, especially the uncontrolled humidity for FIGS. 13A and 13B. FIG. 13C, where humidity was controlled is considered to be the most reliable data, suggests that there is not much difference in the force versus time curves for the starting 3 VDC condition, and the 3 VDC +100 mVAC conditions at 447 Hz, 1,000 Hz, and 10,000 Hz. However, the AC signal did affect the force versus time curves. This effect may not be as consistent as it was for the Variation 1 EAP device, which used an ionic liquid, because the Variation 2 (N115, dry) IPMC EAP device, being dry, was not solvated and may have been further susceptible to humidity variations. FIGS. 13B and 13C also suggest a hysteresis effect (similar to FIG. 12B) in that the final 3 VDC run did not overlay the starting 3 VDC run.

Conclusions: The force versus time measurements that compare the conditions of a simple 3 VDC signal to a 3 VDC+100 mVAC signal at different frequencies indicate that, for the Variation 1 IPMC design (N115, ionic liquid), larger maximum forces are reached with larger AC frequencies. Although there is not clear evidence that the additional AC signal leads to larger forces with the Variation 2 IPMC design (N115, dry), it does appear that the additional AC signal does have affect the force versus time profile. Hermetic sealing or other humidity controls may improve performance and reliability of EAP devices, particularly using the described methods.

Prophetic Example 5

Force Generation at Resonant Frequency

In the preceding experiments, it was noticed that a plot of capacitance versus AC frequency for Variation 1 and Variation 2 did not reveal any peaks in capacitance definitively corresponding to a resonance frequency. Spikes were observed within the data at certain AC frequencies, which appeared to be the result of noise in the data. These frequencies were selected for the force measurements to confirm that they were due to noise, and not resonance frequencies. The spike for the Variation 1 IPMC (N115, ionic liquid) occurred at ~1,780 Hz, and the spike for the Variation 2 IPMC (N115, dry) occurred at ~447 Hz. The lack of resonance frequencies is believed to be an artifact of the construction of Variation 1 and Variation 2. It is expected that EAP devices which exhibit a resonance frequency under these conditions will exhibit increased force generation when an AV signal is applied at the corresponding resonance frequencies To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "selectively" is used in the specification or the claims, it is intended to refer to a condition of a component wherein a user of the apparatus may activate or deactivate the feature or function of the component as is necessary or desired in use of the apparatus. To the extent that the terms "operatively coupled" or "operatively connected" are used in the specification or the claims, it is intended to mean that the identified components are connected in a way to perform a designated function. To the extent that the term "substantially" is used in the specification or the claims, it is intended to mean that the identified components have the relation or qualities indicated with degree of error as would be acceptable in the subject industry.

As used in the specification and the claims, the singular forms "a," "an," and "the" include the plural unless the singular is expressly specified. For example, reference to "a compound" may include a mixture of two or more compounds, as well as a single compound.

As used herein, the term "about" in conjunction with a number is intended to include ±10% of the number. In other words, "about 10" may mean from 9 to 11.

As used herein, the terms "optional" and "optionally" mean that the subsequently described circumstance may or may not occur, so that the description includes instances where the circumstance occurs and instances where it does not.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The various aspects and embodiments disclosed herein are for purposes of illustration and are not intended to be limiting, with the true scope and spirit being indicated by the following claims.

The invention claimed is:

1. A method for actuating an electroactive polymer device, comprising:
providing the electroactive polymer device, the electroactive polymer device comprising a first electrode and a second electrode electrically coupled to an electroactive polymer;
applying a direct current across the electroactive polymer via the first and second electrodes; and
applying an alternating current across the electroactive polymer, the alternating current being applied across the electroactive polymer by at least one of: applying the alternating current to the first and second electrodes; and applying the alternating current by induction,
the direct current in volts DC (VDC) and the alternating current in volts AC (VAC) being applied such that an absolute value of a ratio VDC:VAC is at least about 3:1; and
the direct current and the alternating current in the ratio of at least about 3:1 being effective to cause actuation of the electroactive polymer device to exert a greater force compared to actuation of the electroactive polymer device using the direct current alone.

2. The method of claim 1, the direct current being applied at an absolute voltage between about 0.1 VDC and about 10 VDC.

3. The method of claim 1, the applying the alternating current across the electroactive polymer comprising applying the alternating current across the electroactive polymer via the first and second electrodes.

4. The method of claim 1, the applying the alternating current across the electroactive polymer comprising inducing the alternating current in the electroactive polymer.

5. The method of claim 1, the alternating current being applied at a voltage amplitude between about 1 mVAC and about 10 VAC.

6. The method of claim 1, the electroactive polymer device being characterized by a capacitance, the capacitance being characterized by a resonant frequency, and the alternating current being applied at an AC frequency selected to at least partly couple with the resonant frequency.

7. The method of claim 6, further comprising determining one or both of the capacitance and the resonant frequency characteristic of the capacitance.

8. The method of claim 7, the determining the resonant frequency characteristic of the capacitance comprising: determining the capacitance as a function of frequency; and determining the resonant frequency according to a peak in the capacitance as a function of frequency.

9. The method of claim 7, the determining the capacitance comprising:
determining an impedance of the electroactive polymer device, the impedance value being determined at a corresponding frequency; and
calculating the capacitance according to:

$$C = \frac{1000}{L_t * w * \text{Im}(Z) * \omega}$$

wherein:
C is the at least one capacitance value in mF/cm²;
$L_t$ is a total length in cm of an electroactive polymer layer in the electroactive polymer device;
w is a width in cm of the electroactive polymer layer;
Im(Z) is an imaginary part of the impedance value; and
ω is the corresponding frequency in radians per second.

10. The method of claim 1, the electroactive polymer device comprising a power supply configured to provide the direct current and the alternating current, the applying the direct current and the applying the alternating current comprising controlling the power supply.

11. The method of claim 1, further comprising controlling one or more of: a moisture content of the electroactive polymer device and a humidity level of an environment in which the electroactive polymer device is actuated.

12. An electroactive polymer actuator system, comprising:
an electroactive polymer device, the electroactive polymer device comprising a first electrode and a second electrode electrically coupled to an electroactive polymer layer;
a power supply operatively coupled to the first and second electrodes;
a controller, the controller being programed with instructions for controlling the power supply to:
apply a direct current across the electroactive polymer layer via the first and second electrodes; and apply an alternating current across the electroactive polymer layer by at least one of: the first and second electrodes; and induction,
apply the direct current in volts DC (VDC) and the alternating current in volts AC (VAC) such that an absolute value of a ratio VDC:VAC is at least about 3:1, effective to cause actuation of the electroactive polymer device to exert a greater force compared to actuation of the electroactive polymer device using the direct current alone.

13. The electroactive polymer actuator system of claim 12, the direct current and the alternating current being effective to cause actuation of the electroactive polymer device to exert a greater force compared to actuation of the electroactive polymer device using the direct current alone.

14. The electroactive polymer actuator system of claim 12, the controller being programed with instructions for controlling the power supply to apply:
the direct current at an absolute voltage between about 0.1 VDC and about 10 VDC; and
the alternating current at a voltage amplitude between about 1 mVAC and about 10 VAC.

15. The electroactive polymer actuator system of claim 12, the electroactive polymer device being characterized by a capacitance, the capacitance being characterized by a resonant frequency, and the controller being programed with instructions for controlling the power supply to apply the alternating current at an AC frequency selected to at least partly couple with the resonant frequency.

16. The electroactive polymer actuator system of claim 12, further comprising an impedance sensor operatively coupled to the first and second electrodes and the controller, the controller being programed with instructions for controlling the impedance sensor and the power supply to determine a capacitance of the electroactive polymer device and a resonant frequency characteristic of the capacitance.

17. The electroactive polymer actuator system of claim 16, the controller being programed with instructions for controlling the impedance sensor and the power supply to determine the capacitance, the instructions comprising:
determining an impedance of the electroactive polymer device using the impedance sensor, the impedance value being determined at a corresponding frequency; and
calculating the capacitance according to:

$$C = \frac{1000}{L_t * w * \text{Im}(Z) * \omega}$$

wherein:
C is the at least one capacitance value in mF/cm²;
$L_t$ is a total length in cm of an electroactive polymer layer in the electroactive polymer device;
w is a width in cm of the electroactive polymer layer;
Im(Z) is an imaginary part of the impedance value; and
ω is the corresponding frequency in radians per second.

18. The electroactive polymer actuator system of claim 12, the electroactive polymer device comprising one or more of: an ionic polymer metal composite and an ionic electroactive polymer layer.

19. The electroactive polymer actuator system of claim 12, the electroactive polymer device comprising an electroactive polymer laminate structure comprising:
a first ion conducting binder layer and a second ion conducting binder layer;
an electroactive polymer layer, the electroactive polymer layer being laminated between the first and second ion conducting binder layers; and
a first electrode and a second electrode laminating the first and second ion conducting binder layers and the electroactive polymer layer therebetween,
the electroactive polymer layer, the first and second ion conducting binder layers and the first and second electrodes being operatively coupled to form the electroactive polymer laminate.

20. The electroactive polymer actuator system of claim 12, further comprising a moisture or humidity control device.

* * * * *